Feb. 23, 1960
J. MAHLER
2,925,622
HARD SURFACE TREATMENT FOR PLASTICS
Filed Dec. 3, 1957
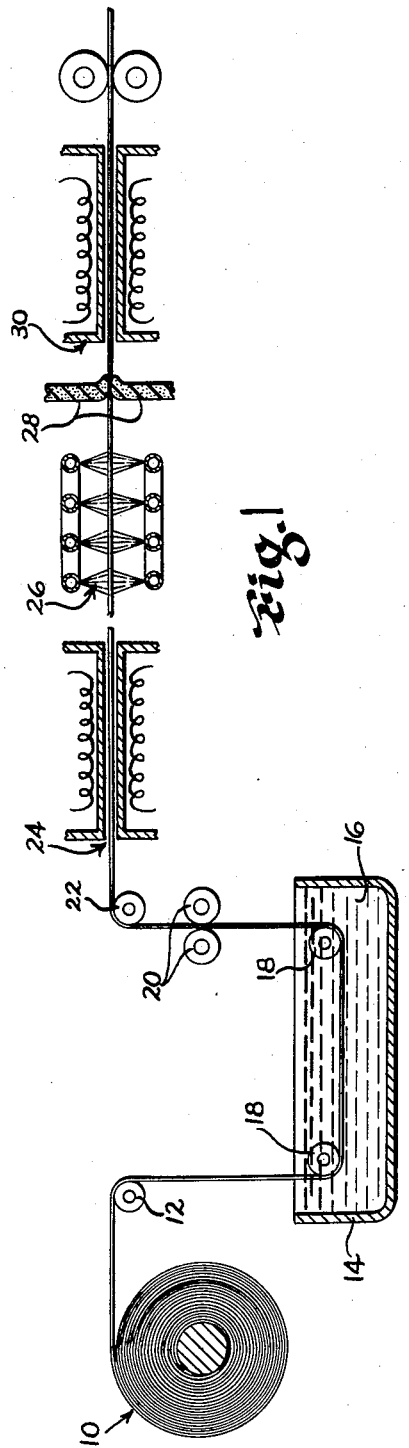
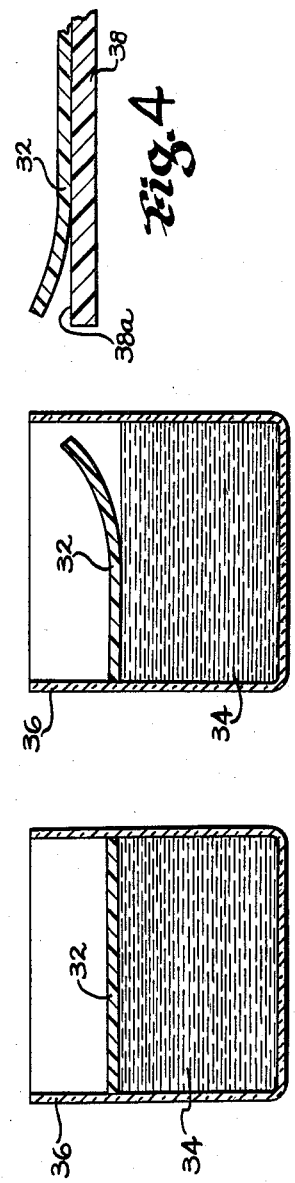
INVENTOR
JOSEPH MAHLER
BY
*Louis L. Gagnon*
ATTORNEY

United States Patent Office 2,925,622
Patented Feb. 23, 1960

2,925,622
HARD SURFACE TREATMENT FOR PLASTICS

Joseph Mahler, Fiskdale, Mass., assignor to American Optical Company, Southbridge, Mass., a voluntary association of Massachusetts Application December 3, 1957, Serial No. 700,412

13 Claims. (Cl. 18—57)

This invention relates to hard surface plastics and has particular reference to an improved method of making the same.

Various transparent organic materials such as cellulose acetate butyrate, cellulose acetate, cellulose nitrate or the like have been found to be a useful and economical substitute for glass in that such materials can be manufactured to have substantially the same optical characteristics as glass while being relatively shatterproof, far less expensive, and considerably lighter in weight. Due to the fact that the above mentioned materials are inherently relatively soft and their surfaces are easily impaired by scratching, it is essential that the surfaces of articles manufactured of such plastics be rendered more resistant to scratching and relatively impervious to attack by organic solvents.

Heretofore, the surface treatment of such organic materials has dealt with the use of organic compounds which involve relatively expensive time consuming and complicated procedures.

In order to overcome the above mentioned and other well known difficulties with regard to the surface treatment of organic materials it is proposed to subcoat the surfaces of said materials with polyvinyl alcohol by any of the conventional techniques and to thereafter render the exposed surface of said polyvinyl alcohol scratch resistant in a novel manner to be disclosed herein as the basis of this invention. In so doing, the materials thus produced are impervious to attack by organic solvents since the polyvinyl alcohol subcoating is inherently insoluble when exposed to organic materials and by rendering the subcoating of polyvinyl alcohol more resistant to scratching, superior articles of manufacture such as lenses or the like may be readily and economically produced from such surface treated materials.

It is, therefore, a principal object of this invention to provide a highly effective, economical and relatively simple process for surface treating plastic materials to render the surfaces thereof scratch resistant and relatively impervious to corrosion without materially altering the physical or optical characteristics of the treated material.

Another object is to provide a novel and improved method for producing a relatively hard surface on polyvinyl alcohol sheeting or film material without materially altering the inherent transparency and flexibility thereof.

Another object is to provide a process for producing a relatively hard surface on cellulose acetate butyrate, cellulose acetate, cellulose nitrate or other such organic materials while dealing solely with water soluble compounds.

Other objects and advantages of the invention will become apparent from the following description when taken in conjunction with the accompanying drawings in which:

Fig. 1 is a diagrammatic illustration of means for surface treating a film material in accordance with a process of the invention; and Figs. 2, 3 and 4 are diagrammatic illustrations of alternative means and method for carrying out the embodiment of the invention.

While the invention is primarily concerned with a process for producing an improved scratch-resistant surface on polyvinyl alcohol materials, it is a well-known fact that it is not economically or otherwise practical to form articles of manufacture directly from large masses of polyvinyl alcohol material or to use such material in itself as a substitute for glass. Consequently, when using polyvinyl alcohol material, it has been customary to subcoat, laminate or otherwise fix a relatively thin film or layer of polyvinyl alcohol on a more economical, durable and readily available substrate such as cellulose acetate, cellulose acetate butyrate, cellulose nitrate or the like. In this manner, various articles of manufacture such as lenses or the like may be formed from the subcoated material while bearing an attached outer surface layer or film of polyvinyl alcohol.

Referring more particularly to the novel features of the invention which involve an improved technique for producing a hard surface on polyvinyl alcohol film or sheet material, there is diagrammatically illustrated in Fig. 1, an arrangement for surface treating plastic film materials on a continuous basis. In this regard, a supply of film material 10 to be treated is provided, preferably in roll form, for ease of handling.

The supply of film material 10 will be considered as being an organic film material such as cellulose acetate butyrate, cellulose acetate or cellulose nitrate which has been subcoated or otherwise provided with an attached outer layer or coating of polyvinyl alcohol which may be applied thereto by lamination or any of the well-known techniques used heretofore. For example, cellulose acetate or butyrate may be subcoated by first hydrolyzing its surfaces with a 10% hydroxide solution containing alcohol and thereafter provided with a polyvinyl alcohol coating in the following manner:

A 10% hydroxide and alcohol solution is prepared by combining 1000 ccs. water, 100 gr. of sodium hydroxide and 300 ccs. of a fresh solution of any commercial denatured alcohol such as the commonly known A5 alcohol. When hydrolyzing acetate materials, an immersion of the material in the hydroxide and alcohol solution for approximately one minute has proven to produce satisfactory results. However, butyrate should be immersed for approximately five to ten minutes. The hydrolyzation of the organic film material then renders its surfaces water-permeable and readily adapted to receive a subcoat of polyvinyl alcohol.

To subcoat the cellulose acetate or butyrate, as the case may be, a polyvinyl alcohol dope is prepared by dissolving commercially available polyvinyl alcohol powder in water. A 3% to 10% solution of polyvinyl alcohol powder in water is used.

To prepare a 5% polyvinyl alcohol dope, for example, 50 grs. of polyvinyl alcohol powder is combined with 1000 ccs. of water.

It is advantageous prior to applying the polyvinyl alcohol dope to the substrate to mix therewith a toughening agent to render the mix less sensitive to moisture. This is accomplished by adding organic acids or chromic nitrate to the polyvinyl dope. If using chromic nitrate, for example, it has been found that approximately ½ gr. of chromic nitrate to each 100 ccs. of a 5% polyvinyl alcohol dope will produce satisfactory results.

Having prepared the polyvinyl alcohol dope in the manner disclosed above, it is uniformly applied to the surfaces of the hydrolyzed cellulose acetate or butyrate with the use of a doctor or the like or, alternatively, the cellulose acetate or butyrate may be dipped into the polyvinyl alcohol dope of a syrupy consistency and passed between rollers or the like to remove any excess of the polyvinyl alcohol dope and to provide a desired uniform coating on the substrate. The polyvinyl alcohol dope when dried to a film will rigidly bond to the hydrolyzed surfaces of the cellulose acetate or butyrate and after a gentle heat of approximately 140° to 180° Fahrenheit to produce the above mentioned initial toughening of the polyvinyl alcohol subcoat which is now ready to be further treated to be more resistant to scratching in accordance with the invention.

It is also a well-known fact that polyvinyl alcohol may be further hardened to some degree by immersion in a boric acid and water solution which chemically reacts with the polyvinyl alcohol to produce a cross-linkage or rearrangement of the molecular structure of the polyvinyl alcohol. However, such a hardening process is far from adequate since it has not been possible heretofore to render the surfaces of polyvinyl alcohol sheet or film material hard enough to resist the damaging effects of abrasion encountered during the normal usage of articles of manufacture such as lenses or the like which may be produced from such subcoated plastic materials.

Referring more particularly to Fig. 1 of the drawings wherein there is diagrammatically illustrated means for carrying out the novel surface hardening process of the invention, it can be seen that the subcoated film material 10, which is relatively soft and easily damaged by scratching or other abrasive actions, is passed from its supply roll over a guide roller 12 and into a tank 14 containing a liquefied gel 16 formed according to the invention of boric acid and water glass (sodium silicate) and which is heated to a temperature of from 120° to 140° Fahrenheit. The gel 16 is prepared by combining equal parts of a stock solution of water glass (sodium silicate) and water, which stock solution is composed of 1 part water and 1 part commercial liquid water glass and a 5% solution of boric acid and water (50 grams of boric acid crystals in 1000 ccs. of water). It is to be understood, however, that the related proportions of the ingredients in the gel 16 may be varied within certain limits and the commercial water glass may be used undiluted or diluted to the extent as to form a stock solution comprising 1 part commercial water glass and from 0 to 3 parts water. Also, a boric acid solution ranging from 3% to 7% may be used. When these ingredients are combined and allowed to set for a period of time of approximately fifteen minutes, a relatively hard gel is formed which, when stirred, becomes liquefied.

The film material 10 is passed through the liquefied gel 16 beneath supporting rollers 18 or the like and outwardly of tank 14 between a pair of rollers 20 which function to remove substantially all of the gel 16 which is carried from tank 14 by the film material 10 while traveling outwardly of the tank 14. The rate of travel of the film material 10 and the distance between rollers 18 is controlled to cause all parts of the film material to be immersed in the liquefied gel 16 for a period of time sufficient to chemically set up an interfacial reaction between the polyvinyl alcohol subcoating on the film and the gel 16 wherein a re-arrangement or cross-linkage of the molecular structure of the surface of the polyvinyl alcohol will take place. It has been found that a time period of from one to 10 minutes will produce satisfactory results.

After passing through rollers 20, the film material 10 is directed by another roller 22 into a heating chamber 24 to be dried. A gentle temperature of approximately 140° Fahrenheit is maintained in chamber 24 and the chamber 24 is of a predetermined length controlled in accordance with the above-mentioned rate of travel of the film material 10 to insure a thorough drying of the film material 10 upon emerging from the chamber 24. The process could be terminated at this point providing the gel 16 had been completely removed by the rollers 20 mentioned above. However, it has been found preferable and more practical to next pass the film material 10 through a washing station so as to insure a thorough cleaning or removal of the gel 16 from its surfaces. In this manner the inherent transparency or optical characteristics of the subcoated film material 10 is not altered by any residue of the gel 16. It is important to note that the film material 10 must be thoroughly dried before any attempt is made to wash its surfaces with water.

The above mentioned washing operation is accomplished by causing the film material 10 to pass through a water washing station 26 which is adapted to thoroughly clean the treated surfaces thereof following which it is wiped by any suitable gentle wiping means 28 such as a sponge rubber or fabric squeegee and dried by passing through a second heating chamber 30 which is substantially identical to heating chamber 24.

By treating the surfaces of film material 10 in the above-described manner, the polyvinyl alcohol subcoating thereon is provided with a relatively hard surface which is scratch-resistant and inherently impervious to attack by organic solvents.

Tests indicate a scratch resistance which is equal or superior to that obtained by known more complicated time-consuming and expensive hard surface treatments used heretofore in the art of plastics and which is suitable for the intended uses of such treated materials.

It is particularly pointed out that the surface treatment process of the invention may be performed by means other than that illustrated in Fig. 1 and the apparatus of Fig. 1 has been given by way of example only. In this respect, it should be understood that the important features of the invention reside in the particular hard surface treatment of polyvinyl alcohol by immersion in a water glass and boric acid liquefied gel followed by proper drying and cleaning procedures such as set forth above.

An alternate method of hard surface treating plastic materials is illustrated in Figs. 2–4 of the drawings wherein a polyvinyl alcohol film 32 is cast over a solidified boric acid, water glass gel and thereafter applied to the surface of a substrate such as cellulose acetate or the like. In the procedure illustrated by Figs. 2–4, a boric acid, water glass gel 34 is prepared in the manner disclosed above and allowed to set up in a suitable container 36 (the gel is not liquefied by stirring). A polyvinyl alcohol dope which is prepared in the previously described manner is poured or otherwise spread over the surface of the hard gel 34 to produce a rapid or nearly instantaneous formation of a solidified film 32 substantially as illustrated in Fig. 2. During the setting up or solidification of the film 32 on the gel 34 (Fig. 3), a chemical reaction takes place between the material of the gel 34 and the material of the film 32 which causes a cross-linkage or re-arrangement of the molecular structure of film 32 which, when film 32 is subsequently thoroughly dried, will render said film 32 relatively hard and scratch-resistant.

The film 32 may be formed to any desired thickness depending upon the amount of polyvinyl alcohol dope applied to the surface of gel 34 and the time it is allowed to remain on the gel 34. It has been found that a time period of one or two minutes is sufficient to form a relatively thick solidified film of polyvinyl alcohol. At this stage of the process, the film 32 is extremely flexible and relatively elastic in nature.

When the film 32 has formed on the gel 34 it is stripped therefrom as diagrammatically illustrated in Fig. 3, and is applied to a suitable substrate 38 such as cellulose acetate or the like (Fig. 4), which has been previously provided with a water permeable subcoat or hydrolyzed in the manner disclosed above for film material 10 of Fig. 1. Thus, the film 32, being composed of water-soluble compounds, will rigidly bond to the water permeable surface 38a of substrate 38. The subcoated article of Fig. 4 is then dried at room temperatures or with a gentle heat of approximately 140° Fahrenheit and when thoroughly dried, the subcoat or film 32 will be rendered relatively hard and scratch-resistant in a manner analogous to the above-described cases.

If it is desired to form a relatively thin film of scratch resistant polyvinyl alcohol material which is not bonded to a substrate such as described above, the film 32 when stripped from the gel 34 is simply dried at room temperatures or with a gentle heat of approximately 140° Fahrenheit.

It is to be clearly understood that various other water permeable articles such as paper, wood or the like may be provided with superior hard surfaces of scratch resistant polyvinyl alcohol by subcoating said articles with a film such as film 32 in a manner analogous to that described above for the substrate 38.

From the foregoing, it should be appreciated that the invention basically embodies the treatment of polyvinyl alcohol materials with water glass and a boric acid and water solution and it can be seen that simple, efficient and economical means and method have been provided for accomplishing all of the objects and advantages of the invention. Nevertheless, it is apparent that many changes in the process may be made without departing from the spirit of the invention as expressed in the following claims and the invention is not limited to the exact matters shown and described as only the preferred matters have been given by way of illustration.

Having described my invention, I claim:

1. The process of providing an article formed of polyvinyl alcohol material with improved surface characteristics comprising placing said article in direct contact with a composition embodying equal parts of a solution whose related proportions of ingredients are equivalent to the combining of from 30 to 70 grams boric acid crystals in 1000 ccs. water, and a solution consisting of from undiluted commercial liquid water glass to 1 part commercial liquid water glass upwardly to 3 parts water for a time interval sufficient to bring about the desired reaction of said composition with the polyvinyl alcohol material of said article, removing said material from said composition and thoroughly drying the same.

2. The process of providing an article formed of polyvinyl alcohol material with improved surface characteristics comprising placing said article in direct contact with a composition embodying equal parts of a solution whose related proportions of ingredients are equivalent to the combining of from 30 to 70 grams boric acid crystals in 1000 ccs. water and a solution consisting of from undiluted commercial liquid water glass to 1 part commercial liquid water glass upwardly to 3 parts water for a time interval of from 1 to 10 minutes, removing said article from said composition and thoroughly drying the same.

3. The process of providing an article formed of polyvinyl alcohol material with improved surface characteristics comprising placing said article in direct contact with a composition embodying equal parts of a solution whose related proportions of ingredients are equivalent to the combining of 50 grams boric acid crystals in 1000 ccs. water and a solution containing one part commercial liquid water glass in one part water for a time interval of from 1 to 10 minutes, removing said article from said composition and thoroughly drying the same.

4. The process of providing an article formed of polyvinyl alcohol material with improved surface characteristics comprising placing said article in direct contact with a composition embodying equal parts of a solution whose related proportions of ingredients are equivalent to the combining of from 30 to 70 grams boric acid crystals in 1000 ccs. water and a solution consisting of from undiluted commercial liquid water glass to 1 part commercial liquid water glass upwardly to 3 parts water for a time interval of from 1 to 10 minutes removing said article from said composition, thereafter removing from said article substantially all of said composition which may be deposited thereon and thoroughly drying the same.

5. The process of providing an article formed of polyvinyl alcohol material with improved surface characteristics comprising preparing a composition embodying equal parts of a solution whose related proportions of ingredients are equivalent to the combining of from 30 to 70 grams boric acid powder in 1000 ccs. water and a solution consisting of from 100% commercial liquid water glass to 25% commercial liquid water glass and 75% water, allowing said composition to set for a period of time sufficient to form a gel, liquefying said gel by stirring the same, heating said liquefied gel to a temperature of from 120° to 140° Fahrenheit, immersing said article in said liquefied and heated gel for a period of time sufficient to bring about the desired reaction of said composition with the polyvinyl alcohol material, of said article removing said article from said liquefied and heated gel and thoroughly drying the same.

6. The process of providing an article formed of polyvinyl alcohol material with improved surface characteristics comprising preparing a composition embodying equal parts of a solution whose related proportions of ingredients are equivalent to the combining of from 30 to 70 grams boric acid powder in 1000 ccs. water and a solution consisting of from 100% commercial liquid water glass to 25% commercial liquid water glass and 75% water, allowing said composition to set for a period of time sufficient to form a gel, heating said liquefied gel to a temperature of from 120° to 140° Fahrenheit, placing said article in contact with said heated gel for a period of time of from 1 to 10 minutes, removing said article from said contact with said heated gel and thoroughly drying the same.

7. The process of providing polyvinyl alcohol film material with improved surface characteristics comprising preparing a composition embodying equal parts of a solution whose related proportions of ingredients are equivalent to the combining of from 30 to 70 grams boric acid powder in 1000 ccs. water and a solution consisting of from undiluted commercial liquid water glass to a dilution of commercial liquefied water glass with water wherein the water does not exceed 3 parts to 1 part commercial liquefied water glass, allowing said composition to set for a period of time sufficient to form a gel, liquefying said gel by stirring the same, heating said liquefied gel to a temperature of from 120° to 140° Fahrenheit, immersing said polyvinyl alcohol film material in said liquefied and heated gel for a period of time of from 1 to 10 minutes, removing said material from said liquefied and heated gel and thoroughly drying the same.

8. The process of forming a polyvinyl alcohol film having improved hardness characteristics which process comprises preparing a composition embodying equal parts of a solution whose related proportions of ingredients are equivalent to the combining of from 30 to 70 grams boric acid ($H_2BO_3$) crystals in 1000 ccs. water and a solution consisting of from undiluted commercial liquid water glass to 1 part commercial liquefied water glass and 3 parts water, allowing said composition to set for a period of time sufficient to cause said composition to solidify in the form of a gel, preparing a polyvinyl alcohol dope whose related proportions of ingredients are equivalent to the combining of from 30 to 100 grams of commercial polyvinyl alcohol powder in 1000 ccs. of water, placing a layer of any desired thickness of said polyvinyl alcohol dope on said gelled composition and allowing the same to remain on said gelled composition for a period of time sufficient to cause it to solidify, thereafter stripping said solidified polyvinyl alcohol dope from said gelled composition and thoroughly drying the same.

9. The process of forming a polyvinyl alcohol film having improved hardness characteristics which process comprises preparing a composition embodying equal parts of a solution consisting of 50 grams boric acid ($H_2BO_3$) crystals in 1000 ccs. water and a solution containing one part commercial liquid water glass in one part water, allowing said composition to set for a period of time sufficient to cause said composition to solidify in the form of a gel, preparing a polyvinyl alcohol dope whose related proportions of ingredients are equivalent to the combining of 50 grams of commercial polyvinyl alcohol powder in 1000 ccs. of water, placing a layer of said polyvinyl alcohol dope on said gelled composition and allowing the same to remain on said gelled composition for a period of time sufficient to cause at least the portion of said dope in contact with said gelled composition to solidify, thereafter stripping said solidified polyvinyl alcohol dope from said gelled composition and thoroughly drying the same.

10. The process of forming a polyvinyl alcohol film having improved hardness characteristics which process comprises preparing a composition embodying equal parts of a solution whose related proportions of ingredients are equivalent to the combining of from 30 to 70 grams boric acid ($H_2BO_3$) crystals in 1000 ccs. water and a solution consisting of from undiluted commercial liquid water glass to 1 part commercial liquefied water glass and 3 parts water, allowing said composition to set for a period of time sufficient to cause said composition to solidify in the form of a gel, preparing a polyvinyl alcohol dope whose related proportions of ingredients are equivalent to the combining of from 30 to 100 grams of commercial polyvinyl alcohol powder in 1000 ccs. of water together with from .30 to 1.00 gram of chromic nitrate per each 100 ccs. of said mixture of polyvinyl alcohol powder and water, placing a layer of any desired thickness of said polyvinyl alcohol dope on said gelled composition and allowing the same to remain on said gelled composition for a period of time sufficient to cause at least the portion of said dope in contact with said gelled composition to solidify and thereafter stripping said solidified polyvinyl alcohol dope from said gelled composition.

11. The process of forming a polyvinyl alcohol film having improved hardness characteristics which process comprises preparing a composition embodying equal parts of a solution whose related proportions of ingredients are equivalent to the combining of 50 grams boric acid ($H_2BO_3$) crystals in 1000 cc. water and a solution containing one part commercial liquid water glass in one part water, allowing said composition to set for a period of time sufficient to cause said composition to solidify in the form of a gel, preparing a polyvinyl alcohol dope whose related proportions of ingredients are equivalent to the combining of 50 grams of commercial polyvinyl alcohol powder in 1000 ccs. of water together with .50 gram chromic nitrate per each 100 ccs. of said combined polyvinyl alcohol and water, placing a layer of said polyvinyl alcohol dope on said gelled composition and allowing the same to remain on said gelled composition for a period of time sufficient to cause said layer to solidify, thereafter stripping said solidified polyvinyl alcohol dope from said gelled composition and allowing the same to dry.

12. The process of providing improved surface characteristics on plastic film materials which are subcoated with polyvinyl alcohol comprising placing said film materials in such manner as to cause said polyvinyl alcohol to be in direct contact with a composition embodying equal parts of a solution whose related proportions of ingredients are equivalent to the combining of from 30 to 70 grams boric acid crystals in 1000 ccs. water and a solution consisting of from undiluted commercial liquid water glass to 1 part commercial liquid water glass and 3 parts water, for a time interval sufficient to bring about the desired reaction of said composition with the polyvinyl alcohol material, removing said film materials from said composition and thoroughly drying the same.

13. The process of providing improved surface characteristics on plastic film material which is subcoated with polyvinyl alcohol which process comprises preparing a composition embodying equal parts of a solution whose related proportions of ingredients are equivalent to the combining of from 30 to 70 grams boric acid crystals in 1000 ccs. water and a solution consisting of from 100% commercial liquid water glass to 25% commercial liquid water glass and 75% water, allowing said composition to set for a period of time sufficient to form a gel, liquefying said gel by stirring the same, heating said liquefied gel to a temperature of from 120° to 140° Fahrenheit, immersing said film material in said liquefied and heated gel for a period of time of from 1 to 10 minutes removing said film material from said liquefied and heated gel, removing any excess of said gel from said film material, thoroughly drying said film material, washing said film material with water to remove substantially all remaining deposits of said gel from said film material, wiping said film material and again thoroughly drying the same.

References Cited in the file of this patent

UNITED STATES PATENTS

| 2,111,272 | Paulson | Mar. 15, 1938 |
| 2,554,850 | Binda | May 29, 1951 |